Figure 1:
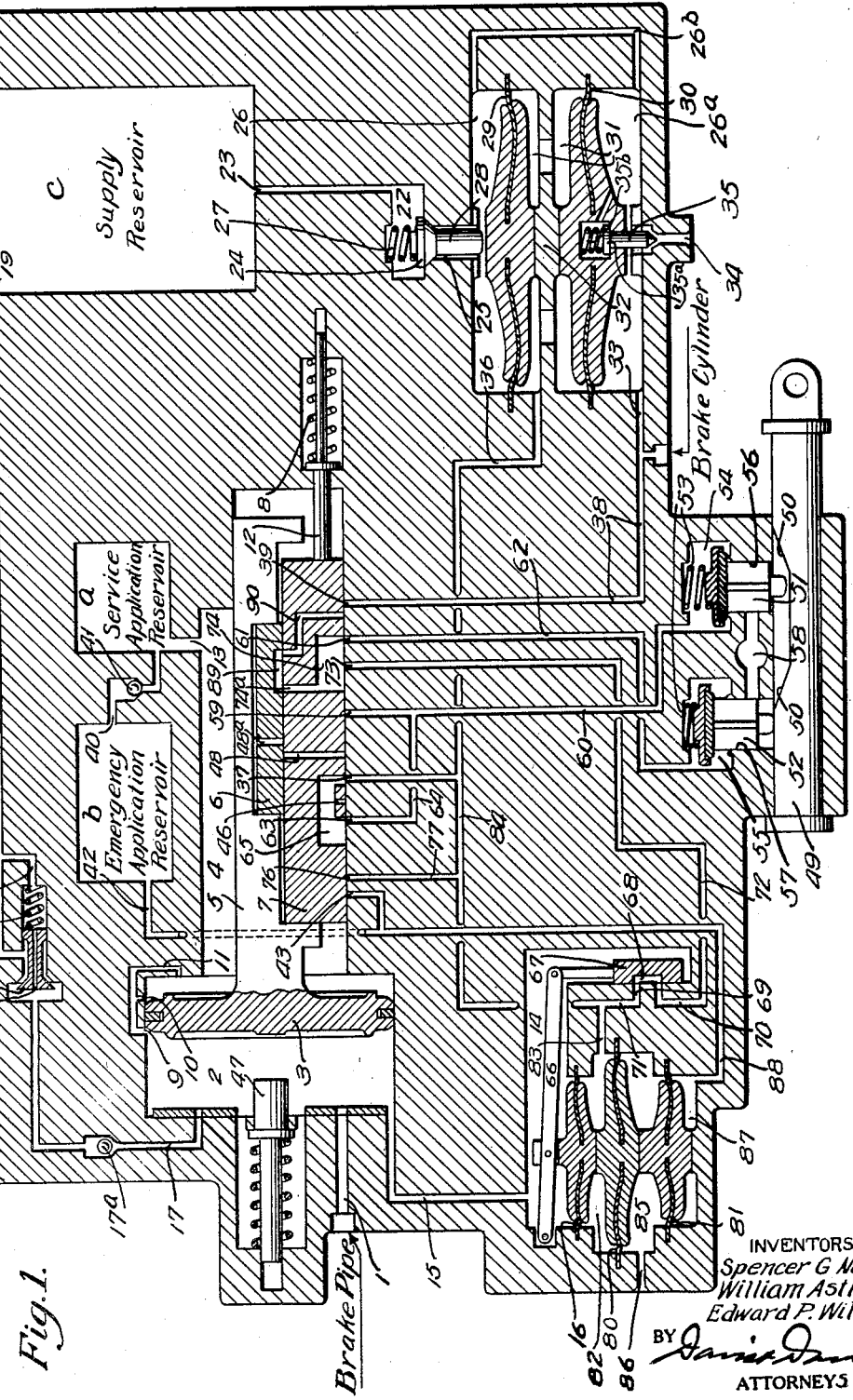

Sept. 28, 1926. 1,601,588
S. G. NEAL ET AL
TRIPLE VALVE FOR AIR BRAKE APPARATUS
Filed Dec. 18, 1925 4 Sheets-Sheet 1

INVENTORS
Spencer G Neal
William Astle
Edward P. Wilson.
BY
ATTORNEYS

Sept. 28, 1926.

S. G. NEAL ET AL 1,601,588

TRIPLE VALVE FOR AIR BRAKE APPARATUS

Filed Dec. 18, 1925.    4 Sheets-Sheet 2

INVENTORS
Spencer G. Neal
William Astle
Edward P. Wilson
BY
ATTORNEYS

Fig. 2.

Sept. 28, 1926.

S. G. NEAL ET AL 1,601,588

TRIPLE VALVE FOR AIR BRAKE APPARATUS

Filed Dec. 18, 1925     4 Sheets-Sheet 3

Fig. 3.

INVENTORS
Spencer G. Neal
William Astle
Edward P. Wilson
BY
ATTORNEYS

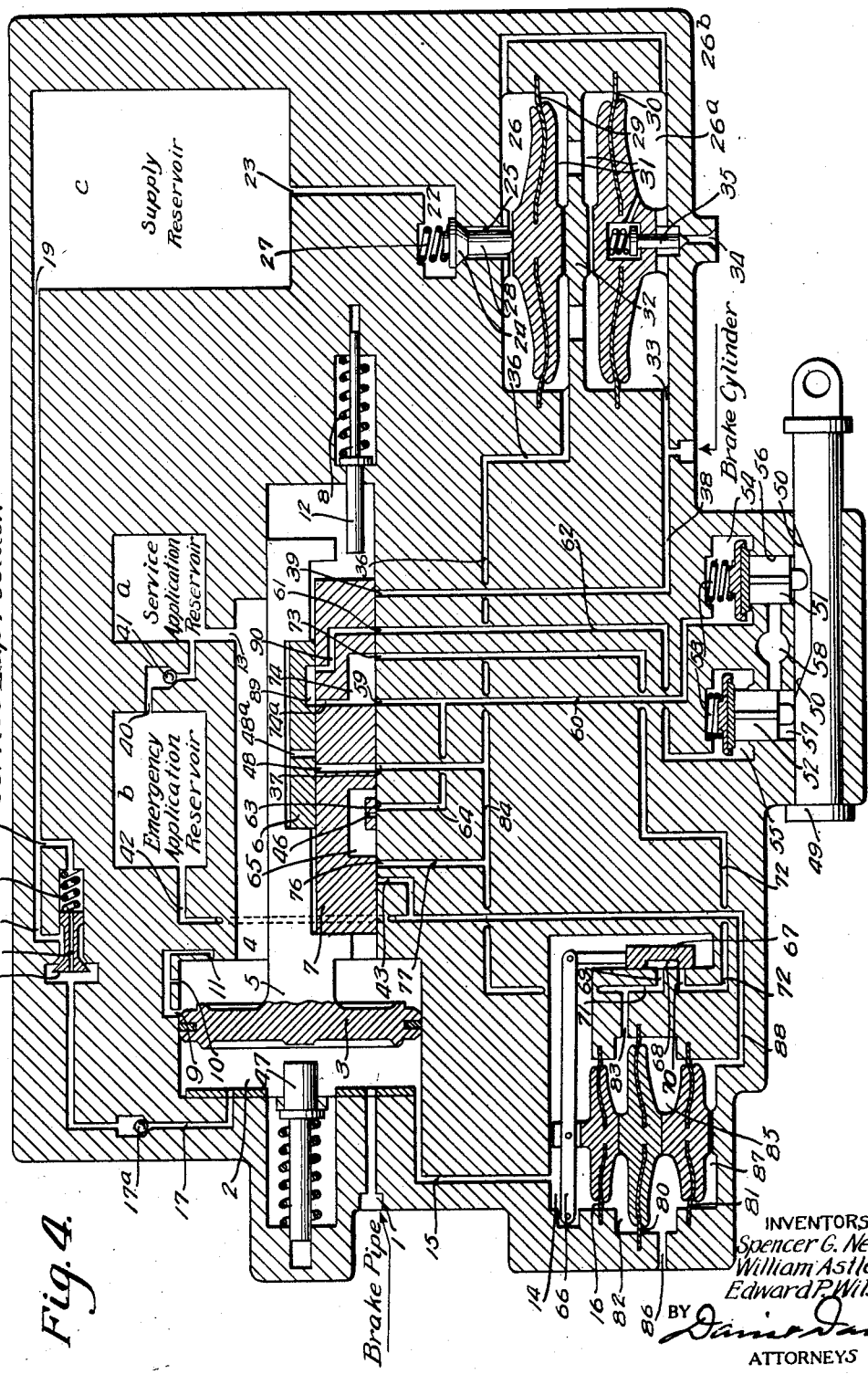

Patented Sept. 28, 1926.

1,601,588

UNITED STATES PATENT OFFICE.

SPENCER G. NEAL, OF NEW YORK, WILLIAM ASTLE, OF BROOKLYN, NEW YORK, AND EDWARD P. WILSON, OF EAST ORANGE, NEW JERSEY, ASSIGNORS TO AUTOMATIC STRAIGHT AIR BRAKE COMPANY, OF WILMINGTON, DELAWARE, A CORPORATION OF DELAWARE.

TRIPLE VALVE FOR AIR-BRAKE APPARATUS.

Application filed December 18, 1925. Serial No. 76,218.

This invention relates to improvements in that type of triple valves which operate upon a reduction of brake pipe pressure to connect a service application reservoir to a control chamber to thereby build up in the control chamber a pressure equal to the desired brake cylinder pressure, said desired brake cylinder pressure being dependent upon and at a predetermined ratio to the pressure reduction in the brake pipe. The pressure in the control chamber moves an application valve to connect a supply reservoir to the brake cylinder. When the brake cylinder pressure has been built up to an equality with the pressure previously established in the control chamber the application valve will be closed.

The main object of this invention is to provide means whereby the control chamber pressure may be released in direct proportion to the increase in brake pipe pressure whereby a positive graduated release of brake cylinder pressure may be obtained.

Another object of the invention is to provide means subject to brake pipe, emergency reservoir and control chamber pressures for regulating the release of control chamber pressure, whereby upon a predetermined increase in brake pipe pressure the control chamber pressure will be reduced a predetermined amount, said reduction of control chamber pressure being regulated by a release control valve which is subject to brake pipe pressure and control chamber pressure opposed to the pressure of an emergency application reservoir.

Features of invention shown in the drawings and described herein, but not claimed are claimed in our co-pending application for patent, Serial No. 45,317, filed July 22, 1925 for triple valves for air brake apparatus.

In the drawings:

Fig. 1 is a diagrammatic view of a triple valve embodying the invention and showing the parts in normal release and reservoir charging position;

Fig. 2 a view similar to Fig. 1 showing the parts in service application position;

Fig. 3 a view similar to Fig. 1 showing the parts in emergency application position; and Fig. 4 a view similar to Fig. 1 showing the parts in service lap position.

In order to simplify the description of the triple valve the various parts and the ports and passages will not be specifically described except in connection with the description of the various operations of the triple valve.

Charging the system.

*Normal charging and normal release position. Fig. 1.*—When charging the system air passes from the brake pipe through passage 1 to the main brake pipe chamber 2 in which is arranged the main operating piston 3. Connected to the chamber 2 is a main slide valve chamber 4. Piston 3 carries a piston stem 5 which extends longitudinally through the valve chamber 4 and is suitably guided therein. Chamber 4 is separated from chamber 2 by the piston 3. The piston stem is operatively connected to a graduating valve 6 and to a main slide valve 7, the main slide valve moving over a seat formed on the lower wall of the valve chamber 4 and the graduating valve operating on top of the main slide valve. There is a lost motion connection between the main slide valve and the piston stem and a direct positive connection between the graduating valve and the piston stem. The increase in pressure in chamber 2 forces the piston 3 inwardly and carries the main slide valve into engagement with a normal charging stop 12. This stop is held in its normal position by a spring 8 which yieldingly holds the valve and the main piston 3 in normal charging position. When the main operating piston is in normal charging position chamber 2 is in communication with chamber 4 through a by-pass port 9 so that chamber 4 will be normally charged through said by-pass port. The by-pass 9 is formed with two branches 10 and 11 which open into the chamber 4, the branch 11 having less capacity than branch 10 and the two branches having a capacity equal to the port 9. When the main piston is in retarded recharging position the passage 10 will be closed and the recharging will take place through the restricted branch port 11, as will be more fully hereinafter described.

A service application reservoir $a$ is in direct open communication with chamber 4 through port 13 and will be charged from chamber 4. The main brake pipe chamber 2 is in direct open communication with air actuating chamber 14 through a passage 15 so that the actuating chamber will be charged directly from brake pipe and the main brake pipe chamber 2. The lower wall of the actuating chamber is formed by an actuating diaphragm 16.

The supply reservoir $c$, from which air is supplied for brake operations, is charged from the main brake pipe chamber 2 through a passage 17, past a non-return check valve 17ª, around a spring-pressed check valve 18 and through passage 19 which opens directly into the supply reservoir. The check valve 18 is normally held open as shown in Fig. 1 by a spring 20. The stem of the check valve is provided with a longitudinally extending restricted charging port 21 through which the supply reservoir will be charged when the check valve 18 is seated and in restricted recharging position as will be hereinafter described. The supply reservoir $c$ is in direct open communication with the application valve chamber 22 through passage 23 so that supply reservoir pressure will be registered in said chamber 22 above the application valve 24. A passage 25 leads from the application valve chamber 22 directly into a brake cylinder pressure chamber 26. The valve 24 seats on the margin of the upper end of this passage and closes comunication between the supply reservoir and the brake cylinder pressure chamber. A spring 27 normally holds the application valve seated and said valve is provided with a depending stem 28 which extends into the brake cylinder pressure chamber. The lower wall of the chamber 26 is formed by a horizontally arranged diaphragm 29, said diaphragm, for convenience, being termed the application diaphragm. The lower end of the stem 28 engages the upper surface of the application diaphragm so that the application valve will be moved in response to the movements of said diaphragm, except that when the diaphragm is in its lowermost position, as shown in Fig. 1, there is a clearance to permit the valve 24 to firmly seat. Below the application diaphragm, and substantially parallel therewith, is arranged a release diaphragm 30. Between these two diaphragms is formed a control chamber 31. In this chamber is arranged a perforated web 32 which serves as a limiting stop to limit the inward movements of the diaphragms toward each other. Below the release diaphragm is formed a brake cylinder pressure chamber 26ª which is connected to the chamber 26 by an open passage 26ᵇ so that the pressure in chambers 26 and 26ª will be always equalized and will be always brake cylinder pressure. The chamber 26ª is connected to a brake cylinder by passage 33. The chamber 26ª is formed with a brake cylinder exhaust port 34 directly below the center of the release diaphragm 30. The release diaphragm carries a brake cylinder exhaust valve 35 adapted to close the upper end of the port 34 and thereby close the brake cylinder exhaust. The control chamber 31 is connected by passage 36 to a port 37 in the main slide valve seat. The brake cylinder is connected by a passage 38 to an emergency port 39 in the main slide valve seat.

An emergency application reservoir $b$ is connected to the service application reservoir $a$ through a passage 40 in which is arranged a back-pressure check valve 41, said valve seating toward the reservoir $a$. The emergency application reservoir will be charged from the service application reservoir and the check valve 41 will prevent air passing back from the emergency application reservoir to the service application reservoir. The reservoir $b$ is connected by passage 42 to a port 43 in the main slide valve seat. This port is closed in all positions of the main slide valve except the emergency position, as will be hereinafter described. Below the actuating diaphragm 16 is arranged an equalizing diaphragm 80 and below the diaphragm 80 is arranged an emergency diaphragm 81. Between the actuating diaphragm and the equalizing diaphragm is formed a supplemental control chamber 82, said chamber being in direct communication with the control chamber 31 through passage 83, passage 84 and passage 36. Below the diaphragm 80 is a chamber 85 which is open to atmosphere at all times through port 86. Below the emergency diaphragm 81 is an emergency chamber 87 which is in open communication with the emergency application reservoir through passage 88 and passage 42 so that emergency application reservoir pressure will always be registered in chamber 87. The equalizing diaphragm 80 is larger in area than the actuating daphragm, and the emergency diaphragm and the actuating diaphagm are of the same area.

*Service application position (Fig. 2).*

To obtain a service application of the brakes a service brake pipe reduction is made in the usual manner through the engineer's brake valve. This service reduction of brake pipe pressure is registered directly in the main brake pipe chamber 2. The pressure in chamber 4 forces the piston 3 toward the left, as viewed in the drawings, until it is stopped by the yielding spring-pressed plunger 47, which constitutes a service stop and arrests the piston and the valves connected therewith in service application position. This movement carries the piston 3 beyond the charging port 9, thereby preventing the flow of air from chamber 4 and reservoir *a* back to the brake pipe. The piston 3 carries with it the main slide valve 7 and the graduating valve 6. The movement of the graduating valve on the main slide valve brings a port 48ª of the graduating valve into register with port 48 in the main slide valve and places said port in communication with the main valve chamber 4. The movement of the main slide valve places said application port 48 in register with port 37 which leads through passage 36 to the control chamber 31 and through passages 84 and 83 into the supplemental control chamber 82. Air will flow from chamber 4 and service application reservoir to the control chambers 31 and 82. Port 48 is so proportioned that the rate of pressure reduction in chamber 4 and in service application reservoir *a* is equal to the rate of pressure reduction in chamber 2 when a service brake pipe reduction is made. This equal rate of pressure drop, plus the resistance of the service spring when the piston is in engagement with the service stop 47, causes the piston and the main slide valve to stop at and remain in service position. When the pressure in chamber 4 drops slightly below that in chamber 2 the piston 3 will be moved inwardly or toward the right, as viewed in the drawings, by the superior pressure in chamber 2 and will carry with it the graduating valve 6 to service lap position. In this position the graduating valve closes port 48 thereby preventing further flow of air from chamber 4.

The combined volume of chambers 31 and 82 is so proportioned to the volume of service application reservoir *a* and the valve chamber 4 as to give the desired ratio between the brake pipe reduction and the pressure in the control chamber 31. For example the volume of the various reservoirs and chambers may be so proportioned that a ten pound brake pipe pressure reduction will result in a build-up of a twenty-five pound pressure in the control chambers 31 and 82 before the graduating valve is moved to lap position. It will, of course, be understood that the ratio of pressure developed in the chambers 31 and 82 may be varied to any desired extent.

The pressure built up in the pressure control chamber 31 forces the release diaphragm 30 downwardly and seats the brake cylinder exhaust valve 35. This pressure build-up also forces upwardly the application diaphragm 29 and opens the application valve 24. When the application valve is opened supply reservoir air will flow from chamber 22 through passage 25 into the brake cylinder pressure chamber 26 and then through passage 26ᵇ into chamber 26ª and to the brake cylinder through passage 33. When the brake cylinder pressure equals the pressure in the control chamber 31 the application diaphragm 29 will be moved downwardly and valve 24 will be seated by the application valve spring 27. The brake cylinder pressure balanced against the pressure in the control chamber 31 is the determining factor in closing the application valve 24. Brake cylinder pressure will, therefore, be built up in the brake cylinder without regard to brake cylinder piston travel and without regard to the brake cylinder leaks. A clearance is provided between the head 35ª of the exhaust valve 35 and the support for the diaphragm 30, so that when the pressures are equalized upon the two sides of the diaphragm 30 said diaphragm may take a middle position without opening valve 35. The spring 35ᵇ and the pressure in chamber 26ª hold the valve 35 to its seat and the diaphragm 30 in its middle position.

If the brake cylinder pressure be reduced by leakage the balance of pressures on the application diaphragm is destroyed and the undisturbed pressure in the control chamber 31 will move the application diaphragm to open the application valve 24. Air will again flow from the supply reservoir to the brake cylinder to supply the pressure lost by leakage.

When the service reduction of brake pipe pressure is made in chamber 2 there is a corresponding reduction of pressure in chamber 14 and the superior pressure in chamber 87 will then raise the actuating diaphragm 16 and move upwardly the release control valve connected thereto. (See Fig. 2.) The pressure in the supplemental control chamber 82 will, of course, be equal to the pressure in the control chamber 31. The equalizing diaphragm 80 will be so proportioned to the actuating diaphragm that the downward force exerted thereon by the pressure in chamber 82 will be just sufficient with the assistance of the brake pipe pressure in chamber 14, to balance the upward force of the emergency reservoir pressure in chamber 87. Assuming that the control chambers are so proportioned to the service application reservoir and the main valve chamber 4 that upon a ten pound brake pipe reduction a twenty-five pound pressure will be built up in the control chambers, the equalizing diaphragm 80 must be so proportioned with respect to the actuating diaphragm and the emergency diaphragm that a twenty-five pound pressure in chamber 82 plus the brake pipe pressure in chamber 14 will balance the upward force exerted by the emergency reservoir pressure in chamber 87. This will result in the diaphragm structure assuming a middle or neutral position, as shown in Fig. 4 and the release control valve will assume its normal or lap position. The operation of the release control valve is hereinafter fully described in connection with the release operation.

Normal release.

*Quick release.*—The triple valve is provided with a release governing mechanism. This mechanism consists of a manually operable rod 49 provided with suitable limiting stops near its ends. This rod is formed with a cavity in one side, the ends of said cavity being inclined to form valve operating cams 50. A quick release valve 51 and a graduated release valve 52 are provided; and these valves are arranged to be operated by the cams 50 on the rod 49. These valves are normally held seated by springs 53 arranged in valve chambers 54 and 55. A quick release port 56 controlled by the quick release valve 51 and a graduated release port 57 controlled by the graduated release valve 52, lead to an atmospheric port 58. The quick release valve chamber 54 is connected to a port 59 in the main slide valve seat by passage 60. The graduated release valve chamber 55 is connected to a port 61 in the main slide valve seat by passage 62. The quick release passage 60 is conected to a port 63 in the main slide valve seat by a branch passage 64.

The operating rod 49 is forced inwardly toward the left as viewed in Figs. 2 and 3 to force the quick release valve 51 to open position and to permit the graduated release valve 52 to close. The quick release chamber 54 is thereby placed in open communication with the atmospheric port 58. This is the position of the operating rod illustrated in Figs. 2 and 3 of the drawings.

For a quick release of the brakes after a service application, the release governing valve rod being in quick release position, the brake pipe pressure is increased a normal amount in the usual manner. The increase in brake pipe pressure will be registered in chamber 2 and will prevail over the pressure in chamber 4 and force the piston 3 and the main slide valve 7 to normal release position (see Fig. 1). The port 59 will be closed by the main slide valve. Port 63 will be in register with release cavity 65 in the main slide valve. Cavity 65 is also in communication with port 37, said port being in communication with the control chambers through passages 36 and 84. Port 63 is in communication with the quick release valve chamber 54 through passages 64 and 60. It is clear, therefore, that the pressure in the control chambers 31 and 82 will be quickly released to atmosphere through the atmospheric port 58. The reduction of pressure in chamber 31 will permit the brake cylinder pressure under the release diaphragm 30 to open the brake cylinder exhaust valve 35 so that brake cylinder pressure will be exhausted to atmosphere through the exhaust port 34.

The increase of brake pipe pressure in chamber 2 will result in a corresponding increase of pressure in the actuating chamber 14 and said increase of pressure will force the actuating diaphragm 16 downwardly. A lever 66 is pivotally connected to an upwardly extending central stem of the actuating diaphragm. This lever is pivoted at one end in the valve casing, its other end being pivotally connected to a release control valve 67. The downward movement of the actuating diaphragm results in a downward movement of the release control valve. This valve is formed with a cavity 68 which in the lower position of said valve connects a port 69 with a port 70. Port 69 is connected by a passage 71 to the passage 84 leading to the control chambers. Port 70 is connected by a passage 72 to a port 73 in the main slide valve seat. In the release position of the main slide valve port 73 opens into a cavity 74 in the main slide valve, said cavity placing port 73 in communication with port 61 of the passage 62 which leads to the graduated release valve chamber 55. In the quick release position of the rod 49 the graduated release valve 52 is closed and therefore the operation of the release control valve 67 is an idle operation in quick release operations.

The actuating diaphragm 16 will be lowered by the pressure in chamber 14 almost immediately upon an increase of pressure in chamber 2. The release control valve 67 will, therefore, immediately respond to an increase of pressure in chamber 2. The result of this will be that the release control valve will be moved downwardly to release position before the main slide valve starts toward release position. In the service position and service lap position of the main slide valve port 59 is in communication with port 73 through the cavity 74 in the main slide valve. It is therefore clear that control chamber pressure will be exhausted to atmosphere through the open quick release valve the instant the release control valve is in release position and before the main slide valve starts toward release position. This insures a quick release of brake cylinder pressure because the control chamber pressure will be partly released through the release control valve before the pressure has been sufficiently built up in chamber 2 to move the piston 3 and the main slide valve to release position. If the main slide valve sticks in service lap position the control chamber pressure will be released to atmosphere through passages 36, 84 and 71, release control valve, passage 72, port 73, cavity 74 of the main slide valve, port 59, passage 60 and quick release valve chamber 54. This will ensure a prompt release of brake cylinder pressure even should the main slide valve stick in service lap position. The release control valve assures a positive and prompt release of the brakes, particularly toward the end of a long train where it is difficult to properly increase the brake pipe pressure sufficiently to overcome the resistance of the main slide valve. The release control valve will move to release position on a slight increase in brake pipe pressure and air will begin to exhaust from the control chamber before the brake pipe pressure has been sufficiently increased to move the main slide valve. This will result in a prompt release of brake cylinder pressure even at the end of a long train.

When the system is fully charged and there has been an equalization of pressures in chambers 2 and 4 there will be a corresponding equalization of pressures in chambers 14 and 87 and the release control valve 67 will be moved upwardly to lap position (see Fig. 4). At this time there will be no pressure in chambers 31 and 82.

The reservoirs will be normally charged in the normal release position of the parts, as hereinbefore described.

*Graduated release. Figs. 1 and 4.*

When operating the triple valve in graduated release the release governing valve rod 49 is moved to the right, as viewed in the drawings and as shown in Figs. 1 and 4. This results in the closure of the quick release valve 51 and the opening of the graduated release valve 52.

To effect a release of brake cylinder pressure after a service application, when operating in graduated release, the brake pipe pressure is increased in the usual manner. If it is desired to effect a full release of the brake cylinder pressure the brake pipe pressure is raised to normal running pressure. If a partial release of the brakes is desired the brake pipe pressure is only partially restored. Assuming that a full release of the brake cylinder pressure is desired the brake pipe pressure is increased in the usual manner and the piston 3 and the main slide valve will be moved to normal release position, or to retarded release position, depending upon the increase of brake pipe pressure. In the service lap position of the main and graduating valves the cavity 74 places the port 59 in communication with port 73. Cavity 74 is in communication through a branch port 74ª with a cavity 89 in the graduating valve and said cavity 89 is in register with a port 90 in the main slide valve. Port 90 is in register with port 61 which leads to the graduated release valve chamber 55. The increase in brake pipe pressure in chamber 2 is practically instantly registered in the actuating chamber 14 and the actuating diaphragm is lowered and the release control valve is placed in release position. The control chamber will be connected through passages 36, 84 and 71 to port 69, cavity 68 in the release control valve, port 70, passage 72, port 73, cavity 74 of the main slide valve, port 74ª, cavity 89 of the graduating valve, port 90 of the main slide valve, port 61, passage 62 to the graduated release valve chamber 55. The graduated release valve 52 is open so that pressure may flow from chamber 55 past valve 52 to the atmospheric port 58. With the release control valve in release position the control chamber pressure will be exhausted to atmosphere immediately and before the main and graduating valves have moved to release position. The increase in brake pipe pressure will exert a force upon piston 3 sufficient to move said piston to the right to open the charging groove 9 and to move the main slide valve 7 to connect port 73 to port 61. The movement of the main slide valve to release position or to retarded release position, in graduated release operations, does not vary the rate of release because the rate of release of control chamber pressure in graduated release operations is controlled entirely by the release control valve 67.

If the increase in brake pipe pressure in chamber 2 is at a very slow rate so that leakage past piston 3 will cause the pressure in chamber 4 to remain approximately equal to the pressure in chamber 2, or if the slide valve 7 offers undue resistance to movement from service position the control chamber pressure may be wholly released through the release control valve with the main slide valve and the graduating valve in service lap position.

To effect a partial release of the brake cylinder pressure the brake pipe pressure is increased the desired amount less than the normal running pressure. The result of increasing brake pipe pressure will be to increase the pressure in chamber 4 through the charging ports and to increase the pressure in the actuating chamber 14. This increase in pressure in chamber 14 will move the diaphragm 16 downwardly thereby placing the release control valve in release position. The pressure in the emergency reservoir *b* is at all times registered in chamber 87 below the emergency diaphragm 81 and the control chamber 31 is at all times in direct and open communication with the supplemental control chamber 82. With the release control valve in release position air from chambers 82 and 31 will be exhausted to atmosphere. The release control valve will remain in release position until the pressure in chamber 82 has been reduced to a point where the undisturbed emergency reservoir pressure in chamber 87 will overcome the increased brake pipe pressure in chamber 14 and the pressure remaining in chamber 82 and the control valve 67 will be moved upwardly to lap position. In lap position ports 69 and 70 are closed. The brake cylinder pressure in chamber 26ª will lift the release diaphragm 30 and open the brake cylinder exhaust valve 35. When the brake cylinder pressure has been exhausted to a point slightly below the remaining pressure in the control chamber the exhaust valve 35 will be closed by the superior pressure in the control chamber. The release of control chamber pressure is controlled through the operation of the release control valve. A partial restoration of the brake pipe pressure will result in a partial release of pressure from the control chamber and the control valve is operated by brake pipe pressure and control chamber pressure opposed to the emergency reservoir pressure. The amount of brake cylinder pressure retained in the brake cylinder will depend upon the increase in brake pipe pressure in chamber 14. When the brake pipe pressure is fully restored in chamber 14 the release control valve will be held in its release position until the chambers 31 and 82 have been reduced to atmospheric pressure and this will result in a complete release of brake cylinder pressure.

By increasing the brake pipe pressure in steps the brake cylinder pressure may be reduced in steps or graduated off. It is therefore manifest that by increasing or decreasing the brake pipe pressure the brake cylinder pressure may be correspondingly decreased or increased as desired. When the pressure in chambers 4 and 14 has been fully restored to original running pressure the control chamber 31 will be wholly exhausted and at the same time the pressure in the brake cylinder chambers 26 and 26ª will be reduced to atmospheric pressure.

*Emergency application. Fig. 3.*

For an emergency application of the brakes an emergency reduction in brake pipe pressure is made in the usual manner. The rapid reduction in pressure is registered in chamber 2. The pressure in chamber 4 cannot be reduced at an equal rate through ports 89 and 48 with the result that the piston 3 will be moved to its extreme position toward the left, as viewed in the drawings, compressing the service stop spring and setting against a sealing gasket arranged in chamber 2. The various parts of the triple valve will assume the positions shown in Fig. 3. The emergency application reservoir will be directly connected to the control chamber 31 and to the supplemental control chamber 82 thereby establishing in said chambers a high emergency pressure. This emergency pressure will act on the diaphragms 29 and 30 as set forth in connection with the description of a service application.

A release of the brake cylinder pressure following an emergency application is obtained by increasing the brake pipe pressure in chamber 2 so as to move the piston 3 and the main and supplemental slide valves to release position. When the main slide valve is in release position the release of brake cylinder pressure and the recharging of the various reservoirs takes place as hereinbefore described.

What we claim is:

1. In a fluid pressure brake the combination with a brake pipe, a supply reservoir, an emergency application reservoir and a brake cylinder chamber, of an application valve controlling communication between the supply reservoir and the brake cylinder chamber, a control chamber, means adapted to be moved by the opposed pressures of the control chamber and the brake cylinder chamber for opening and closing said application valve, a brake cylinder exhaust valve, means adapted to be moved by the opposed pressures of the control chamber and the brake cylinder chamber for opening and closing said exhaust valve, means operated by a reduction of brake pipe pressure to establish in the said control chamber a pressure equal to the desired brake cylinder pressure said established pressure moving the application valve to open position, and means subject to brake pipe and control chamber pressures opposed to the pressure in the emergency application reservoir and operating upon an increase in brake pipe pressure to exhaust air from said control chamber.

2. In a fluid pressure brake the combination with a brake pipe, a supply reservoir, an emergency application reservoir and a brake cylinder chamber, of an application valve controlling communication between the supply reservoir and the brake cylinder chamber, a control chamber, means adapted to be moved by the opposed pressures of the control chamber and the brake cylinder chamber for opening and closing said application valve, a brake cylinder exhaust valve, means adapted to be moved by the opposed pressures of the control chamber and the brake cylinder chamber for opening and closing said exhaust valve, means operated by a reduction of brake pipe pressure to establish in the said control chamber a pressure equal to the desired brake cylinder pressure said established pressure moving the application valve to open position, and means subject to brake pipe and control chamber pressures opposed to the pressure of the emergency application reservoir and operating upon an increase in brake pipe pressure to exhaust air from said control chamber at a predetermined ratio to the increase in brake pipe pressure.

3. In a fluid pressure brake the combination with a brake pipe, a supply reservoir, an emergency application reservoir and a brake cylinder chamber, of an application valve controlling communication between the supply reservoir and the brake cylinder chamber, a control chamber, means adapted to be moved by the opposed pressures of the control chamber and the brake cylinder chamber for opening and closing said application valve, a brake cylinder exhaust valve, means adapted to be moved by the opposed pressures of the control chamber and the brake cylinder chamber for opening and closing said exhaust valve, means operated by a reduction of brake pipe pressure to establish in the said control chamber a pressure at a predetermined ratio to the reduction in brake pipe pressure said established pressure moving the application valve to open position, and means subject to brake pipe and control chamber pressures opposed to the pressure in the emergency application reservoir, and operating upon an increase in brake pipe pressure to exhaust air from said control chamber at a predetermined ratio to the increase in brake pipe pressure.

4. In a fluid pressure brake the combination with a brake pipe, a supply reservoir, and a brake cylinder chamber, of an application valve controlling communication between the supply reservoir and the brake cylinder chamber, a control chamber, means adapted to be moved by the opposed pressures of the control chamber and the brake cylinder chamber for opening and closing said application valve, means operated by a reduction of brake pipe pressure to establish in the said control chamber a pressure at a predetermined ratio to the reduction in brake pipe pressure said established pressure moving the application valve to open position, and means operating upon an increase in brake pipe pressure to exhaust air from said control chamber at a predetermined ratio to the increase in brake pipe pressure.

5. In a fluid pressure brake the combination with a brake pipe, a supply reservoir, an emergency application reservoir and a brake cylinder chamber, of an application valve controlling communication between the supply reservoir and the brake cylinder chamber, a control chamber, means adapted to be moved by the opposed pressures of the control chamber and the brake cylinder chamber for opening and closing said application valve, means operated by a reduction of brake pipe pressure to establish in the said control chamber a pressure at a predetermined ratio to the reduction in brake pipe pressure said established pressure moving the application valve to open position, and means subject to brake pipe and control chamber pressures opposed to the pressure in the emergency application reservoir and operating upon an increase in brake pipe pressure to exhaust air from said control chamber at a predetermined ratio to the increase in brake pipe pressure.

6. A fluid pressure brake comprising a main slide valve and a graduating slide valve movable to service application position upon a reduction of brake pipe pressure and movable to release position upon an increase of brake pipe pressure, a release control valve movable to release position upon an increase of brake pipe pressure, and means whereby the release control valve in release position will permit the brake cylinder pressure to exhaust while the main slide valve and the graduating valve are in service lap position.

7. A fluid pressure brake comprising a main slide valve and a graduating slide valve movable to service application position upon a reduction of brake pipe pressure and movable to release position upon an increase of brake pipe pressure, a release control valve movable to release position upon an increase of brake pipe pressure, a manually operable graduated release valve, and means whereby the release control valve in release position will co-operate with the graduated release valve when the main slide valve and the graduating valve are in service lap position.

8. A fluid pressure brake comprising a main slide valve and a graduating slide valve movable to service application position upon a reduction of brake pipe pressure and movable to release position upon an increase of brake pipe pressure, a release control valve movable to release position upon an increase of brake pipe pressure, a manually operable graduated release valve, means whereby the release control valve in release position will co-operate with the graduated release valve when the main slide valve and the graduating valve are in service lap position, and means whereby the main slide valve in release position will co-operate with the graduated release valve and with the release control valve when the said control valve is in release position.

9. In a fluid pressure brake the combination with a brake pipe, a supply reservoir, an emergency application reservoir and a brake cylinder chamber, of an application valve controlling communication between the supply reservoir and the brake cylinder chamber, a control chamber, means adapted to be moved by the opposed pressures of the control chamber and the brake cylinder chamber for opening and closing said application valve, means operated by a reduction of brake pipe pressure to establish in the said control chamber a pressure at a predetermined ratio to the reduction in brake pipe pressure said established pressure moving the application valve to open position, a release control valve, an actuating diaphragm, an equalizing diaphragm larger in area than the actuating diaphragm, an emergency diaphragm, the actuating diaphragm forming one wall of an actuating chamber, a supplemental control chamber between the actuating diaphragm and the equalizing diaphragm, the emergency diaphragm forming one wall of an emergency chamber, means connecting the actuating chamber to the brake pipe, means connecting the supplemental control chamber to the control chamber, means connecting the emergency reservoir chamber to the emergency application reservoir, and means connecting the release control valve to the actuating diaphragm whereby said valve will be subject to brake pipe pressure and control chamber pressure opposed to the emergency reservoir pressure, and will operate upon an increase in brake pipe pressure to exhaust air from the control chamber at a predetermined ratio to the increase in brake pipe pressure.

10. A fluid pressure brake comprising a brake pipe, a supply reservoir, an emergency application reservoir, a brake cylinder chamber, a main slide valve, a graduating valve, an application valve controlling communication between the supply reservoir and the brake cylinder chamber, a control chamber, means adapted to be moved by the opposed pressures of the control chamber and the brake cylinder chamber for opening and closing said application valve, a release control valve subject to brake pipe and control chamber pressures opposed to the pressure in the emergency application reservoir, a manually operable quick release valve, a manually operable graduated release valve, means whereby the release control valve will co-operate with the main and graduating valves in connecting the control chamber to the graduated release valve, means whereby the release control valve will co-operate with the main slide valve in connecting the control chamber to the quick release valve, and means whereby the main slide valve in release position will connect the control chamber to the quick release valve independently of the release control valve.

11. In a fluid pressure brake the combination with a brake pipe, a supply reservoir, a brake cylinder chamber, and a source of pressure substantially constant during service braking operations, of an application valve controlling communication between the supply reservoir and the brake cylinder chamber, a control chamber, means adapted to be moved by the opposed pressures of the control chamber and the brake cylinder chamber for opening and closing said application valve, a brake cylinder exhaust valve, means adapted to be moved by opposed pressures of the control chamber and the brake cylinder chamber for opening and closing said exhaust valve, means operated by a reduction of brake pipe pressure to establish in said control chamber a pressure equal to the desired brake cylinder pressure said established pressure moving the application valve to open position, and means subject to brake pipe and control chamber pressures opposed to the said substantially constant pressure and operating upon an increase in brake pipe pressure to exhaust air from said control chamber.

12. In a fluid pressure brake the combination with a brake pipe, a supply reservoir, a brake cylinder chamber, and a source of pressure substantially constant during service braking operations, of an application valve controlling communication between the supply reservoir and the brake cylinder chamber, a control chamber, means adapted to be moved by the opposed pressures of the control chamber and the brake cylinder chamber for opening and closing said application valve, a brake cylinder exhaust valve, means adapted to be moved by opposed pressures of the control chamber and the brake cylinder chamber for opening and closing said exhaust valve, means operated by a reduction of brake pipe pressure to establish in said control chamber a pressure equal to the desired brake cylinder pressure said established pressure moving the application valve to open position, and means subject to brake pipe and control chamber pressures opposed to the said substantially constant pressure and operating upon an increase in brake pipe pressure to exhaust air from said control chamber at a predetermined ratio to the increase in brake pipe pressure.

In testimony whereof we hereunto affix our signatures.

SPENCER G. NEAL.
WILLIAM ASTLE.
EDWARD P. WILSON.